(12) United States Patent
Niimi et al.

(10) Patent No.: US 8,151,555 B2
(45) Date of Patent: Apr. 10, 2012

(54) POWER SOURCE SYSTEM OF INTERNAL COMBUSTION ENGINE

(75) Inventors: Kuniaki Niimi, Aichi-ken (JP); Tomihisa Oda, Numazu (JP); Takanori Ueda, Susono (JP); Kenichi Tsujimoto, Susono (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 272 days.

(21) Appl. No.: 12/304,399

(22) PCT Filed: Jul. 12, 2007

(86) PCT No.: PCT/JP2007/064290
§ 371 (c)(1),
(2), (4) Date: Dec. 11, 2008

(87) PCT Pub. No.: WO2008/007809
PCT Pub. Date: Jan. 17, 2008

(65) Prior Publication Data
US 2009/0293465 A1     Dec. 3, 2009

(30) Foreign Application Priority Data
Jul. 12, 2006   (JP) .................................. 2006-192147

(51) Int. Cl.
*F01N 3/00*     (2006.01)
*F01N 3/10*     (2006.01)

(52) U.S. Cl. ................ 60/286; 60/284; 60/295; 60/300; 60/301; 60/303

(58) Field of Classification Search ................... 60/284, 60/285, 286, 295, 299, 300, 301, 303
See application file for complete search history.

(56) References Cited

U.S. PATENT DOCUMENTS

| 5,327,991 | A | 7/1994 | Yoshida |
| 5,588,291 | A | 12/1996 | Maus et al. |
| 5,765,371 | A * | 6/1998 | Hibino et al. .................... 60/284 |
| 2004/0103651 | A1 | 6/2004 | Bennett et al. |
| 2007/0277515 | A1 * | 12/2007 | Igarashi ......................... 60/303 |

FOREIGN PATENT DOCUMENTS

EP     1 279 817 A2     1/2003
(Continued)

OTHER PUBLICATIONS

Kojima, English Abstract of JP 2000-310110 A, Nov. 7, 2000.*

(Continued)

*Primary Examiner* — Thomas Denion
*Assistant Examiner* — Audrey K Bradley
(74) *Attorney, Agent, or Firm* — Sughrue Mion, PLLC

(57) ABSTRACT

Provided is a technology enabling a temperature of an exhaust gas purifying device to rise more surely by operating an electric heater for a catalyst attached with the electric heater more steadily without exerting an excessive load on a battery. Included are the battery and the electric heater operating upon being supplied with electric power from the battery and heating an occlusion-reduction type NOx catalyst, wherein it is predicted, from a point that a SOx occluded quantity into the occlusion-reduction type NOx catalyst is equal to or larger than S1, that a SOx poisoning recovery process will be executed in near future (S102), and a charging level of the battery is increased (S106) by raising a voltage of power generation of an alternator (S103).

1 Claim, 8 Drawing Sheets

FOREIGN PATENT DOCUMENTS

| | | | |
|---|---|---|---|
| FR | 2 727 720 | A1 | 6/1996 |
| FR | 2 810 369 | A1 | 12/2001 |
| JP | 2847976 | B2 | 9/1992 |
| JP | 05-030672 | A | 2/1993 |
| JP | 2548065 | Y2 | 3/1993 |
| JP | 09-158716 | A | 6/1997 |
| JP | 09-217636 | A | 8/1997 |
| JP | 10-288028 | A | 10/1998 |
| JP | 2000310110 | A * | 11/2000 |
| JP | 2001-355434 | A | 12/2001 |
| JP | 2006077671 | A * | 3/2006 |
| WO | 02/053885 | A1 | 7/2002 |

OTHER PUBLICATIONS

Masaaki Kojima, Machine Translation of JP 2000-310110 A, Nov. 7, 2000.*

Partial European Search Report dated May 26, 2010 issued in European Application No. 10003223.4-1263 (8 pages).

* cited by examiner

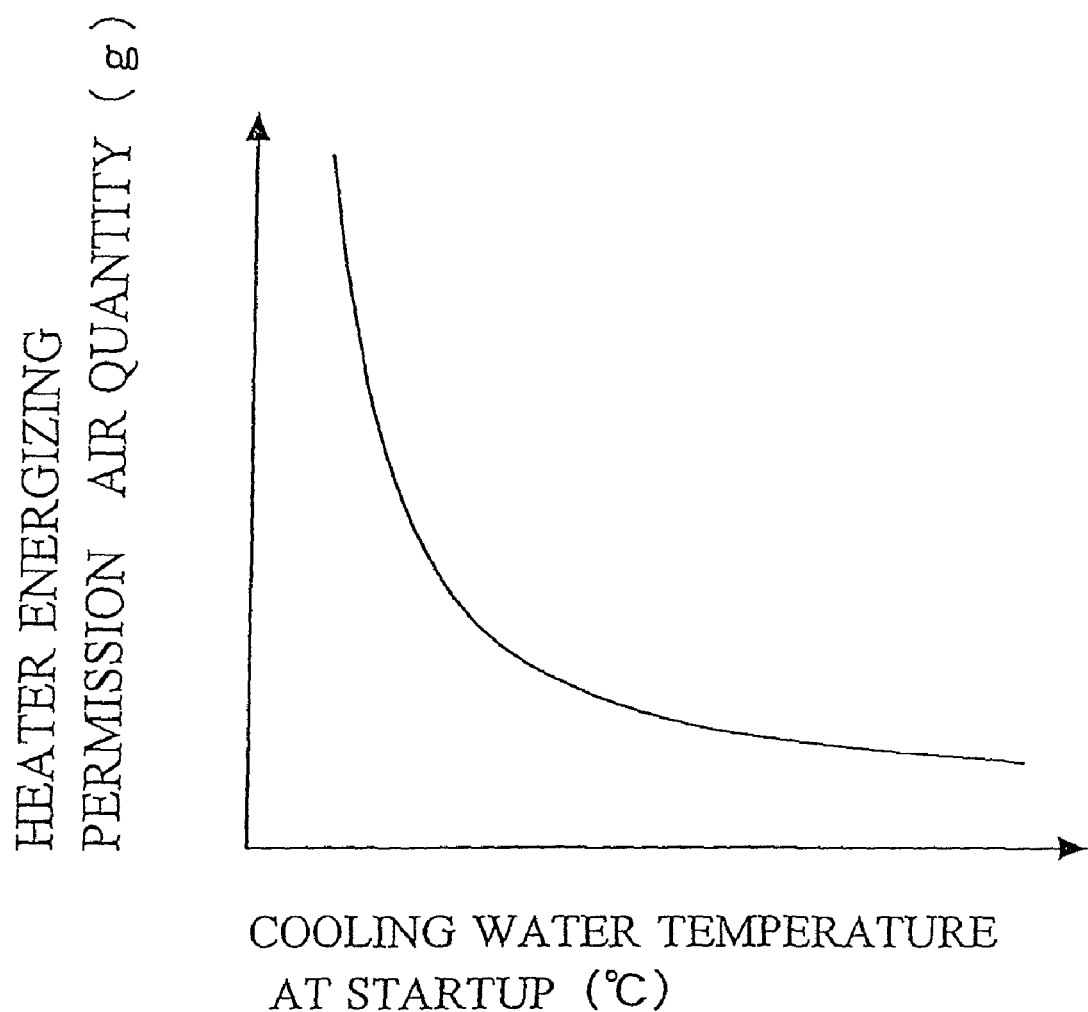

POWER SOURCE SYSTEM OF INTERNAL COMBUSTION ENGINE

CROSS REFERENCE TO RELATED APPLICATION

This application is a National Stage of International Application No. PCT/JP2007/064290 filed Jul. 12, 2007, claiming priority based on Japanese Patent Application No. 2006-192147, filed Jul. 12, 2006, the contents of all of which are incorporated herein by reference in their entirety.

TECHNICAL FIELD

The present invention relates to a power source system of an internal combustion engine, which supplies electric power to and thus operates peripheral devices such as an electric heater of an exhaust gas purifying device.

BACKGROUND ARTS

An exhaust gas of an internal combustion engine contains toxic substances such as NOx. It is known that a NOx catalyst for purifying the exhaust gas of NOx is provided in an exhaust system of the internal combustion engine in order to reduce discharge of these toxic substances. This technology might cause a case in which when a temperature of the NOx catalyst is low, a NOx purifying efficiency decreases. It is therefore required that the temperature of the NOx catalyst be raised up to a temperature enabling the exhaust gas to be sufficiently purified of NOx.

Further, for example, in the case of providing an occlusion-reduction type NOx catalyst, a purifying capacity decreases due to an increase in quantity of the occluded NOx, a reducing agent is supplied to the occlusion-reduction type NOx catalyst, and the NOx occluded in the occlusion-reduction type NOx catalyst is reduction-released (which will hereinafter be termed a [NOx reduction process]). Further, so as to overcome a SOx poisoning which causes a decline of the purifying capacity due to the occlusion of SOx existing in the exhaust gas into the occlusion-reduction type NOx catalyst, in some case reducing agent is supplied to the occlusion-reduction type NOx catalyst and the temperature of the occlusion-reduction type NOx catalyst is raised (which will hereinafter be referred to as a [SOx regeneration process]).

On the other hand, in a particulate filter (which will hereinafter simply be called a [filter]) that traps particulate matters contained in the exhaust gas of the internal combustion engine, if a quantity of accumulation of the trapped particulate matters increases, a backpressure in the exhaust gas rises due to clogging of the filter, and engine performance declines. Accordingly, a temperature of the filter is increased by raising the temperature of the exhaust gas introduced into the filter, the trapped particulate matters are removed by oxidation, thereby scheming to regenerate the exhaust gas purifying performance of the filter (which will hereinafter be termed a [PM regeneration process]).

As described above, the NOx catalyst and the filter each serving as the exhaust gas purifying device are required to be heated in many cases. In this respect, there is an instance of providing a catalyst device bearing an oxidation catalyst and incorporating an electric heater (EHC: Electrically Heated Catalyst) in an exhaust path on an upstream side of the exhaust gas purifying device such as the NOx catalyst and the filter described above. In this instance, when raising the temperature of the exhaust gas purifying device, the oxidation catalyst is activated by electrically heating the catalyst device attached with the electric heater, and the temperature of the exhaust gas purifying device is raised by utilizing the heat of the catalyst device attached with the electric heater. The electric heater, however, entails much consumption of the electric power, and the case is that a load on the battery is increased by frequently using the electric heater. Moreover, in the case of strengthening the battery and the alternator, this is an obstacle against cost-down and downsizing of the apparatus.

Concerning the technology described above, as disclosed in Japanese Patent Application Laid-Open Publication No. 9-158716, such a technology is proposed that time for supplying the electrical power to the electric heater of the catalyst device is determined based on a charging state of the battery. This technology, however, has an instance that the operation of the electric heater is restricted depending on the charging state of the battery, with the result that a temperature of the exhaust gas purifying device is hard to rise sufficiently.

Further, Japanese Patent Application Laid-Open Publication No. 9-217636 discloses a technology, wherein during a period of supplying the electric power to the electric heater for the catalyst device attached with the electric heater, number-of-revolution-of-engine variable means increases the number of revolutions of the engine, and quantity-of-power-generation variable means increases a quantity of power generation by a generator. In this technology, however, the number of revolutions of the engine changes due to the power generation, and hence, if the number of idling revolutions fluctuates especially during an idling operation, an uncomfortable feeling might be given to an vehicle occupant.

Moreover, in a technology disclosed in Patent Application Publication No. 2847976, a voltage of the battery is detected, and a duty ratio of the electric power supplied to the electric heater is acquired from the detected battery voltage and from a predetermined heater voltage. Then, battery energizing time supplied (the time for which to supply the electricity) to the electric heater is duty-controlled at the acquired duty ratio, thereby supplying a fixed amount of electric power to the electric heater.

Moreover, a technology disclosed in Japanese Utility Model Application No. 2548065 is that the internal combustion engine is controlled based on the electric power of the battery, the electric power of the alternator and that of the electric heater for the catalyst.

DISCLOSURE OF INVENTION

It is an object of the present invention to provide a technology of operating more surely an electrical loading device such as an electric heater for a catalyst device attached with the electric heater without exerting an excessive load on a battery.

To accomplish the above object, the present invention has a principal feature of including a battery and an electrical loading device operating upon being supplied with electric power from the battery, and raising a charging level of the battery, if it is predicted that the electrical loading device will consume an electric power quantity equal to or larger than a predetermined quantity and irrespective of an actual power consumption mode during the use of the electrical loading device, up to a level equal to or higher than a predetermined pre-power-consumption level.

More specifically, a power source system of an internal combustion engine, including a battery and an electrical loading device operating upon being supplied with electric power from the battery, comprises: electric power consumption predicting unit predicting that the electrical loading device consumes electric power of which a quantity is equal to or larger than a predetermined quantity; and pre-power-consumption charging unit raising, if the electric power consumption predicting unit predicts that the electrical loading device consumes the electric power of which the quantity is equal to or larger than the predetermined quantity, a charging level of the battery to a level equal to or higher than a predetermined pre-power-consumption level and irrespective of a power consumption mode during the use of the electrical loading device.

Namely, if predicting the electrical loading device will consume the electric power quantity equal to or larger than the predetermined quantity (e.g., power consumption of large electric power for a long period of time), the charging level of the battery is raised up to the level equal to or higher than the predetermined pre-power-consumption level (not that the battery is charged with the electricity corresponding to the power consumption of the electrical loading device during the use of the electrical loading device but) before the operation of the electrical loading device. According to this scheme, when the electrical loading device actually consumes the electric power, it is feasible to restrain the excessive load from being exerted on the battery and to restrain the operation of the electrical loading device from being restricted due to deficiency of a total amount of charge (correspond to the charging level) of the battery.

Herein, the electric power quantity equal to or larger than the predetermined quantity is an electric power quantity considered to cause influence on electric power supply performance of the battery in the case of consuming the electric power quantity in an insufficient state of the charging level of the battery, and may also be empirically determined beforehand. Moreover, the charging level of the predetermined pre-power-consumption level is a charging level considered not to cause deterioration of the electric power supply performance of the battery even when consuming the electric power quantity equal to or larger than the predetermined quantity in a state where the charging level of the battery is equal to or higher than the predetermined pre-power-consumption level, and may also be obtained empirically beforehand. The phrase "irrespective of a power consumption mode during the use of the electrical loading device" described above, connotes that the battery is not charged with the electricity corresponding to the electric power consumption by the electrical loading device during the use of the electrical loading device.

Further, according to the present invention, the power source system of the internal combustion engine may further comprise: an exhaust gas purifying device purifying an exhaust gas of the internal combustion engine; and performance recovering unit executing a performance recovery process of recovering exhaust gas purifying performance of the exhaust gas purifying device by removing matters accumulated in the exhaust gas purifying device as the exhaust gas purifying device purifies the exhaust gas in a way that heats the exhaust gas purifying device, wherein the electrical loading device may be an electric heater that generates the heat by energization and heats the exhaust gas purifying device.

Presumed specifically in this case as the performance recovery process is a PM regeneration process of raising the temperature of the exhaust gas purifying device and oxidizing and removing the particulate matters trapped within the exhaust gas purifying device. Alternatively, the presumed process is a SOx poisoning recovery process of reduction-releasing the SOx occluded in the exhaust gas purifying device by supplying a reducing agent as well as by increasing the temperature of the exhaust gas purifying device. Further, the electric heater for heating the exhaust gas purifying device on the occasion of executing the PM regeneration process or the SOx poisoning recovery process, is served as the electrical loading device described above.

Then, in this case, when the electric power consumption predicting unit predicts that the exhaust gas purifying device will be subjected to the PM regeneration process or the SOx poisoning recovery process in near future, the pre-power-consumption charging unit raises the charging level of the battery. If done so, in the case of heating the exhaust gas purifying device with the electric heater in the PM regeneration process or the SOx poisoning recovery process, the exhaust gas purifying device can be sufficiently heated without exerting an excessive load on the battery. Moreover, it is possible to avoid such a situation that the PM regeneration process or the SOx poisoning recovery process can not be thoroughly completed due to deficiency of the total amount of charge (correspond to the charging level) of the battery.

Further, according to the present invention, the pre-power-consumption charging unit may raise the charging level of the battery to the level equal to or higher than the pre-power-consumption level by enhancing a power generation capacity of the alternator. Still further, the pre-power-consumption charging unit may also raise the charging level of the battery to the level equal to or higher than the pre-power-consumption level by increasing the number of idling revolutions of the internal combustion engine.

Moreover, on this occasion, the electric power consumption predicting unit may predict, from a point that an accumulated quantity of the matters in the exhaust gas purifying device becomes equal to or larger than a predetermined first accumulated quantity, that the electric heater consumes the electric power quantity equal to or larger than the predetermined quantity.

Herein, whether or not the PM regeneration process or the SOx poisoning recovery process are executed for the exhaust gas purifying device, is often determined based on detecting or predicting an accumulated quantity (trapped quantity) of the particulate matters in the filter, or an accumulated quantity (occluded quantity) of the SOx into the occlusion-reduction type NOx catalyst, they are defined as the matters accumulated in the exhaust gas purifying device (the purifying is executed by eliminating them from the exhaust gas), in a way that knows the respective accumulated quantities become equal to or larger than threshold values. Then, the threshold value on this occasion is the trapped quantity of the particulate matters with which to increase a backpressure due to clogging of the filter with the particulate matters, or is a SOx occluded quantity with which a NOx occlusion capacity of an occlusion-reduction type NOx catalyst decreases.

According to the present invention, a contrivance is that at a stage before the accumulated quantities of the particulate matters or the SOx accumulated in the exhaust gas purifying device become equal to or larger than the threshold values described above, i.e., at the stage of reaching the first accumulated quantity which is less than the threshold value described above, it is predicted that the PM regeneration process or the SOx poisoning recovery process will be executed in the near future, and the charging level of the battery is raised up to the pre-power-consumption level. With this contrivance, it is feasible to predict highly accurately how the PM regeneration process or the SOx poisoning recovery process are executed and to, without exerting the excessive load on the battery, carry out the PM regeneration process or the SOx poisoning recovery process at higher efficiency.

Moreover, according to the present invention, the exhaust gas purifying device may be an occlusion-reduction type NOx catalyst, and the performance recovery process may also be a NOx reduction process. Then, in this case, when the quantity of the NOx occluded in the occlusion-reduction type NOx catalyst becomes equal to or larger than the predetermined second accumulated quantity greater than the first accumulated quantity, the electric heater may start being energized, and, when the quantity of the NOx accumulated in the exhaust gas purifying device becomes equal to or larger than the predetermined third accumulated quantity greater than the second accumulated quantity, addition of the reducing agent may be started.

With this contrivance, to begin with, at a stage that the quantity of the NOx occluded in the occlusion-reduction type NOx catalyst gets equal to or larger than the first accumulated quantity, the charging level of the battery is raised up to the pre-power-consumption level. Next, at a stage that the quantity of the NOx becomes equal to or larger than the second accumulated quantity, the electric heater starts being energized. Furthermore, at a stage that the quantity of the NOx gets equal to or larger than the third accumulated quantity, the supply of the reducing agent is started, thereby starting the NOx reduction process.

Therefore, on the occasion of starting the NOx reduction process, the charging level of the battery is sufficiently increased, and the temperature of the occlusion-reduction type NOx catalyst is raised. With this contrivance, the supplied reducing agent is reformed in an easier-to-react state and gets easy to be gasified, whereby the NOx reduction process can be executed at the higher efficiency.

Further, the present invention may also be a power source system of an internal combustion engine, comprising: a battery; an exhaust gas purifying device purifying an exhaust gas of the internal combustion engine; performance recovering unit executing a performance recovery process of recovering exhaust gas purifying performance of the exhaust gas purifying device by removing matters accumulated in the exhaust gas purifying device as the exhaust gas purifying device purifies the exhaust gas in a way that heats the exhaust gas purifying device; an electric heater generating the heat by energization from the battery and heats the exhaust gas purifying device; and an alternator generating electric power in linkage with an operation of the internal combustion engine and charging the battery with the electricity, wherein an amount of charge into the battery from the alternator is increased by raising the number of idling revolutions of the internal combustion engine up to the predetermined number of idling revolutions during a performance recovery irrespective of ON/OFF states of the electric heater during execution of the performance recovery process by the performance recovering unit.

Considered herein is a case of supplying the electric power to the electric heater from the battery, heating the exhaust gas purifying device with the heat generated by the electric heater, and executing the performance recovery process. For example, when conducting the PM regeneration process or the SOx poisoning recovery process, in the case of controlling an air-fuel ratio of the exhaust gas at rich/lean levels repeatedly by supplying the reducing agent, there are many cases of performing the control of switching ON/OFF the electric heater in synchronization with rich/lean timings of the air-fuel ratio of the exhaust gas. Moreover, in the case of conducting this type of control, there are also many cases of increasing the number of idling revolutions of the internal combustion engine in synchronization with the ON/OFF timings of the electric heater, and augmenting the amount of charge into the battery by increasing the quantity of the power generation by the alternator.

Then, it follows that the number of idling revolutions of the internal combustion engine changes at a specified interval during the execution of the performance recovery process of the exhaust gas purifying device, and such a case arises that an uncomfortable feeling is given to a vehicle occupant. In this case, the present invention aims at restraining the number of idling revolutions of the internal combustion engine from increasing in synchronization with the ON/OFF timings of the electric heater during the execution of the performance recovery process of the exhaust gas purifying device, and restraining the uncomfortable feeling from being given to the vehicle occupant.

By contrast, according to the present invention, the amount of charge into the battery by the alternator is increased by raising the number of idling revolutions of the internal combustion engine up to the number of revolutions during the predetermined performance recovery irrespective of the ON/OFF states of the electric heater for the duration of executing the performance recovery process by the performance recovering unit.

Herein, "the number of revolutions during the predetermined performance recovery" connotes the number of revolutions of the internal combustion engine, which enables, by setting the number of idling revolutions of the internal combustion engine to this number of revolutions, the battery to be supplied with the electric power quantity equal to or larger than the electric power quantity consumed by the electric heater during the performance recovery process and enables the charging level to be maintained.

With this contrivance, it is possible to restrain the number of idling revolutions of the internal combustion engine from changing at the specified interval during the performance recovery process, and to restrain the uncomfortable feeling from being given to the vehicle occupant.

Furthermore, the present invention may also be a power source system of an internal combustion engine, comprising: an exhaust gas purifying device purifying an exhaust gas of the internal combustion engine; performance recovering unit executing a performance recovery process of recovering exhaust gas purifying performance of the exhaust gas purifying device by removing matters accumulated in the exhaust gas purifying device as the exhaust gas purifying device purifies the exhaust gas in a way that heats the exhaust gas purifying device; and an electric heater generating the heat by energization and heats the exhaust gas purifying device, wherein if the internal combustion engine stops during execution of the performance recovery process by the performance recovering unit, the electric heater is inhibited from being energized during a predetermined period after starting up the internal combustion engine next time.

Namely, if the internal combustion engine stops during the PM regeneration process and the SOx poisoning recovery process, such a possibility is high that the reducing agent supplied to the exhaust gas purifying device when executing the PM regeneration process or the SOx poisoning recovery process stays inside the exhaust gas purifying device or in the vicinity of the electric heater. Then, in the case of operating the electric heater when starting up the internal combustion engine next time, the reducing agent residual in the exhaust gas purifying device reacts at once, and the temperature of the exhaust gas purifying device might excessively rise. In this instance, the present invention aims at restraining, in the case of operating the electric heater when starting up the internal combustion engine, the reducing agent residual in the exhaust gas purifying device since the engine stop of the last time from reacting at once, and restraining the temperature of the exhaust gas purifying device from excessively rising.

With respect to this point, according to the present invention, if the internal combustion engine stops during the execution of the performance recovery process by the performance recovering unit, the electric heater is inhibited from being energized for a predetermined period of time after starting up the internal combustion engine next time. With this contrivance, it is feasible to restrain, in the state where the reducing agent stays in the exhaust gas purifying device, the exhaust gas purifying device from being heated by the electric heater and to restrain the temperature of the exhaust gas purifying device from excessively rising.

Still further, the present invention may also be a power source system of an internal combustion engine, comprising: a battery; an exhaust gas purifying device purifying an exhaust gas of the internal combustion engine; an electric heater generating the heat by energization from the battery and heats the exhaust gas purifying device; charging level detecting unit detecting a charging level of the battery; and a heater fault diagnosing unit electrifies, if the charging level detecting unit detects that the charging level of the battery is equal to or higher than a predetermined fault diagnosing level, the electric heater and diagnoses about a fault of the electric heater on the basis of a rise in temperature of the exhaust gas on the occasion of this energization.

Herein, in the case of diagnosing about the fault of the electric heater, there are many cases of generating the heat by actually energizing the electric heater, detecting a rise in the temperature of the exhaust gas on this occasion, and determining whether an as-expected rise in the temperature is acquired or not. Accordingly, if the electric heater is diagnosed about it's fault in a state where the charging level of the battery is not sufficiently high, there is a case of exerting the excessive load on the battery. In this case, the present invention aims at restraining, in the state where the charging level of the battery is not sufficiently high, the diagnosis about the fault of the electric heater, and restraining the excessive load from being exerted on the battery.

In this point, a contrivance of the present invention is that the charging level detecting unit detecting the charging level of the battery is provided, and the charging level detecting unit diagnoses about the fault of the electric heater only when the charging level of the battery is equal to or higher than the predetermined fault diagnosing level.

It should be noted that the fault diagnosing level is, if a charging level is equal to or higher than the fault diagnosing level, the charging level at which the excessive load is not exerted on the battery even when making the diagnosis about the fault by actually energizing the electric heater. The case where the charging level is equal to or higher than the fault diagnosing level, connotes a case in which the charging level of the battery gets proximal to the full-charging level without any prediction, e.g., a time period during or after a long duration of the decelerating operation. Then, an assumption that the charging level of the battery be intentionally increased is not inclusive.

Namely, according to the present invention, the electric heater is diagnosed about its fault in a way that selects the timing when the charging level of the battery gets equal to or higher than the fault diagnosing level, it is therefore possible to restrain the excessive load from being exerted on the battery, and the fuel consumption is not affected because of no intentional rise of the charging level of the battery.

Moreover, the present invention may also be a power source system of an internal combustion engine, comprising: a battery; an exhaust gas purifying device purifying an exhaust gas of the internal combustion engine; performance recovering unit executing a performance recovery process of recovering exhaust gas purifying performance of the exhaust gas purifying device by removing matters accumulated in the exhaust gas purifying device as the exhaust gas purifying device purifies the exhaust gas in a way that heats the exhaust gas purifying device; an electric heater generating the heat by energization from the battery and heats the exhaust gas purifying device; and an alternator generating electric power in linkage with an operation of the internal combustion engine and charging the battery with the electricity, wherein when starting up the internal combustion engine, the electric heater is energized after an integrated value of quantities of the exhaust gases passing through the exhaust gas purifying device becomes equal to or larger than a predetermined trigger exhaust gas quantity.

Herein, as described above, in the case of energizing the electric heater, for restraining the excessive load from being exerted on the battery, such control is conducted as to augment the amount of charge into the battery by the alternator by increasing the number of idling revolutions, and so on.

If the number of idling revolutions is forcibly increased such as when starting up the internal combustion engine at a cold time, there is a case of having an increased load on the internal combustion engine. In this case, the present invention aims at restraining the number of idling revolutions from being forcibly increased such as when starting up the internal combustion engine at the cold time, and restraining the excessive load from being exerted on the internal combustion engine. In this respect, a contrivance in the power source system of the internal combustion engine according to the present invention is that after starting up the internal combustion engine, the electric heater is energized after the integrated value of the quantities of the exhaust gases passing through the exhaust gas purifying device becomes equal to or larger than the predetermined trigger exhaust gas quantity.

With this contrivance, the electric heater can be energized in a state where the warm-up of the internal combustion engine has made progress to some degree, and hence, even when the amount of charge into the battery is increased by raising the number of idling revolutions as the electric heater is energized, the load on the internal combustion engine itself can be restrained from increasing.

Herein, the predetermined trigger exhaust gas quantity is the integrated value of the quantities of the exhaust gasses passing through the exhaust gas purifying device, from which to determine, if the integrated value of the quantities of the exhaust gasses passing through the exhaust gas purifying device is equal to or larger than the predetermined trigger exhaust gas quantity, that the warm-up of the internal combustion engine has made progress and, even when increasing the number of idling revolutions, the load on the internal combustion engine does not rise, and may also be empirically obtained beforehand. Furthermore, the integrated value of the quantities of the exhaust gasses passing through the exhaust gas purifying device may also be replaced with an integrated value of intake air quantities in the internal combustion engine.

Moreover, the trigger exhaust gas quantity may be determined corresponding to a cooling water temperature when starting up the internal combustion engine. To be specific, the trigger exhaust gas quantity may be set smaller as the cooling water temperature when starting up the internal combustion engine gets higher.

Namely, if the cooling water temperature is high when starting up the internal combustion engine, it implies that the warm-up of the internal combustion engine has already been in progress to some extent, and hence the trigger exhaust gas quantity can be set much smaller. With this contrivance, it is feasible to restrain the inhibition of energizing the electric heater over a long period of time with futility, to heat up the exhaust gas purifying device much earlier, and to improve exhaust gas purifying efficiency.

It should be noted that the means for solving the problems in the present invention can be combined to the greatest possible degree and can be thus employed.

BRIEF DESCRIPTION OF DRAWINGS

FIG. 8 is a graph showing a relation between a heater energizing permission air quantity and a cooling water temperature when starting up the internal combustion engine in an embodiment 5 of the present invention.

BEST MODE FOR CARRYING OUT THE INVENTION

An in-depth description of a best mode for carrying out the present invention will hereinafter be made in an exemplified manner with reference to the drawings.

Embodiment 1

Figure 1:
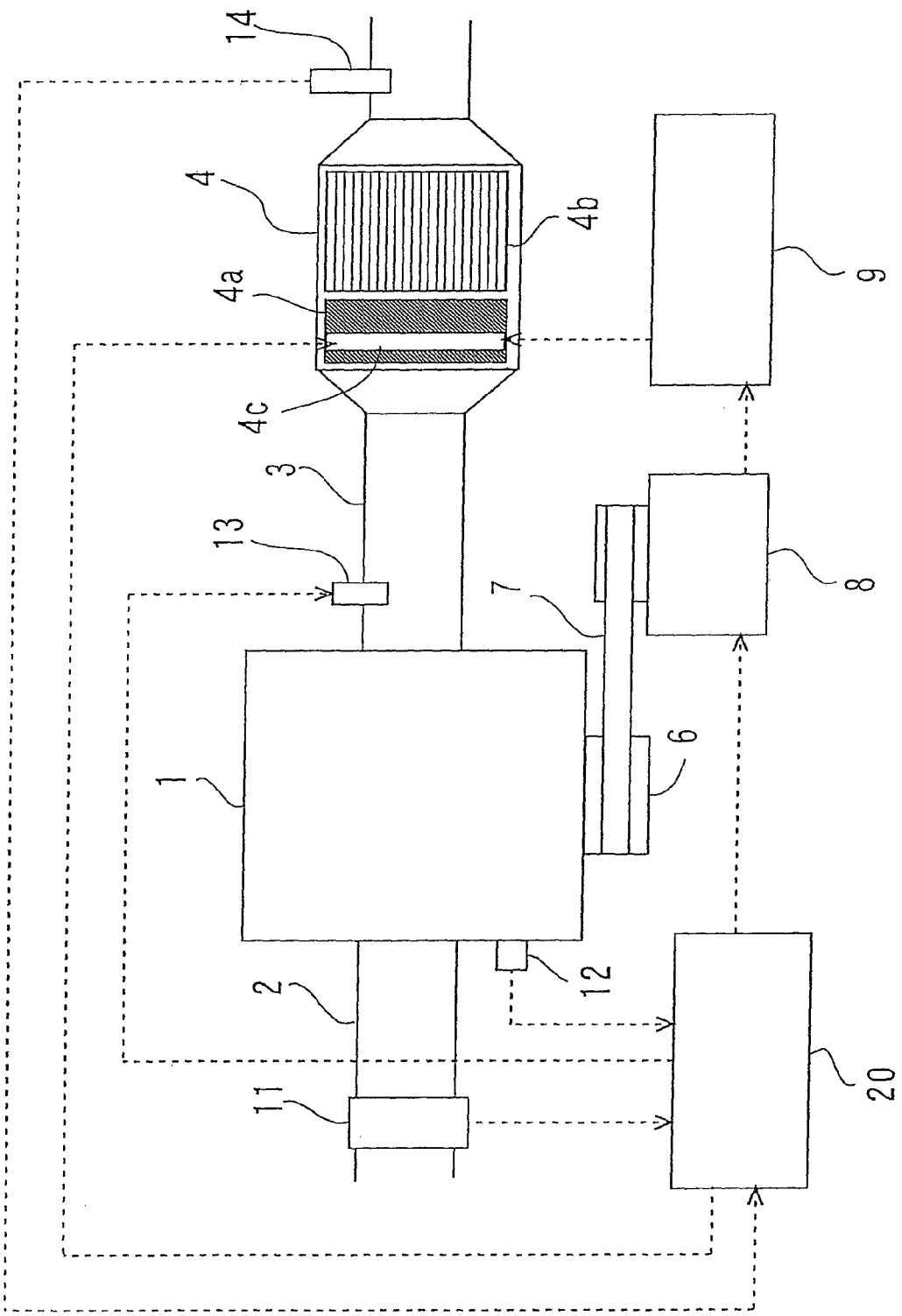
FIG. 1 is a diagram illustrating a whole construction of an internal combustion engine, an intake/exhaust system thereof and a control system thereof in embodiments of the present invention.

FIG. 1 illustrates a whole construction of an internal combustion engine, and intake/exhaust system and a control system, to which an embodiment 1 is applied. An intake pipe 2 and an exhaust pipe 3 are connected to an internal combustion engine 1, wherein fresh air is sucked via the intake pipe 2 into the internal combustion engine 1, and a post-combustion gas in the internal combustion engine 1 is discharged through the exhaust pipe 3. The intake pipe 2 is provided with an airflow meter 11 for detecting an intake air quantity.

The exhaust pipe 3 is provided with an exhaust gas purifying device 4 that purifies an exhaust gas. The exhaust gas purifying device 4 includes a DPNR 4b having a function of a filter that traps particulate matters in the exhaust gas and also a function of the occlusion-reduction type NOx catalyst that purifies the exhaust gas of NOx. Further, an EHC 4a capable of electrically raising a temperature is provided upstream of the DPNR 4b in the exhaust gas purifying device 4. An electric heater 4c is provided inwardly of the EHC 4a, wherein a temperature of the EHC 4a rises by energizing this electric heater 4c.

Further, an alternator 8 classified as a generator is connected via a belt 7 to an output shaft 6 of the internal combustion engine 1, wherein rotations of the output shaft 6 of the internal combustion engine 1 are propagated to the alternator 8, thereby generating the electricity. The generated electric power is supplied to the battery 9, whereby the battery 9 is charged with the electricity. Moreover, the battery 9 and an electric heater 4c of the EHC 4a are electrically connected, in which the electric heater 4c generates the heat upon being supplied with the electric power from the battery 9.

For others, the exhaust pipe 3 includes a fuel addition valve 13 that adds the fuel as a reducing agent to the exhaust gas flowing into the exhaust gas purifying device 4 in the PM regeneration process, the NOx reduction process or the SOx poisoning recovery process of the exhaust gas purifying device 4. Furthermore, the internal combustion engine 1 includes a cooling water temperature sensor 12 that detects a cooling water temperature. Provided further downstream of the exhaust gas purifying device 4 in the exhaust pipe 3 is an exhaust gas temperature sensor 14 that detects a temperature of the exhaust gas discharged from the exhaust gas purifying device 4.

An electronic control unit (ECU) 20 is disposed beside the internal combustion engine 1. The ECU 20 is a unit that controls an operational state of the internal combustion engine 1, corresponding to an operating condition of the internal combustion engine 1 and in response to a request of a driver, and executes a recovery process of purifying performance of the exhaust gas purifying device 4.

For instance, in the case of carrying out the SOx poisoning recovery process of the exhaust gas purifying device 4, the electric heater 4c is switched ON according to an instruction given from the ECU 20. Thereupon, the electric heater 4c is supplied with the electric power from the battery 9 and generates the heat, thereby activating the EHC 4a. Then, the fuel is added via the fuel addition valve 13 and causes, as a reducing agent, oxidation reduction reaction in the EHC 4a, with the result that a temperature of the EHC 4a becomes high and a temperature of the exhaust gas rises. Moreover, the fuel as the reducing agent is reformed and gasified in the EHC 4a, whereby the fuel reaching an easier-to-react state is thus supplied to the DPNR 4b.

The temperature of the DPNR 4b is thereby raised up to a temperature needed for the SOx poisoning recovery process, then the reducing agent in the easy-to-react state is supplied, and the SOx within the DPNR 4b is reduction-released.

Herein, if the SOx poisoning recovery process is conducted in a state where the charging level of the battery 9 is not sufficiently high, the battery 9 comes to have a large load, and a deficiency such as a drop of the voltage of the battery 9 might be brought about. Moreover, if the electric heater 4c is supplied with the electric power matching with the charging level of the battery 9, such a case exists that a quantity of the heat generation is small and the SOx poisoning recovery process can not be efficiently carried out. This being the case, if it is predicted that the control requiring consumption of the large electric power over a long period of time such as the SOx poisoning recovery process will be conducted in near future, a scheme of the embodiment 1 is not that the battery is charged with the electricity corresponding to actual ON/OFF states of the electric heater 4c during the SOx poisoning recovery process but that the charging level of the battery 9 is previously set to rise before the SOx poisoning recovery process.

Figure 2:
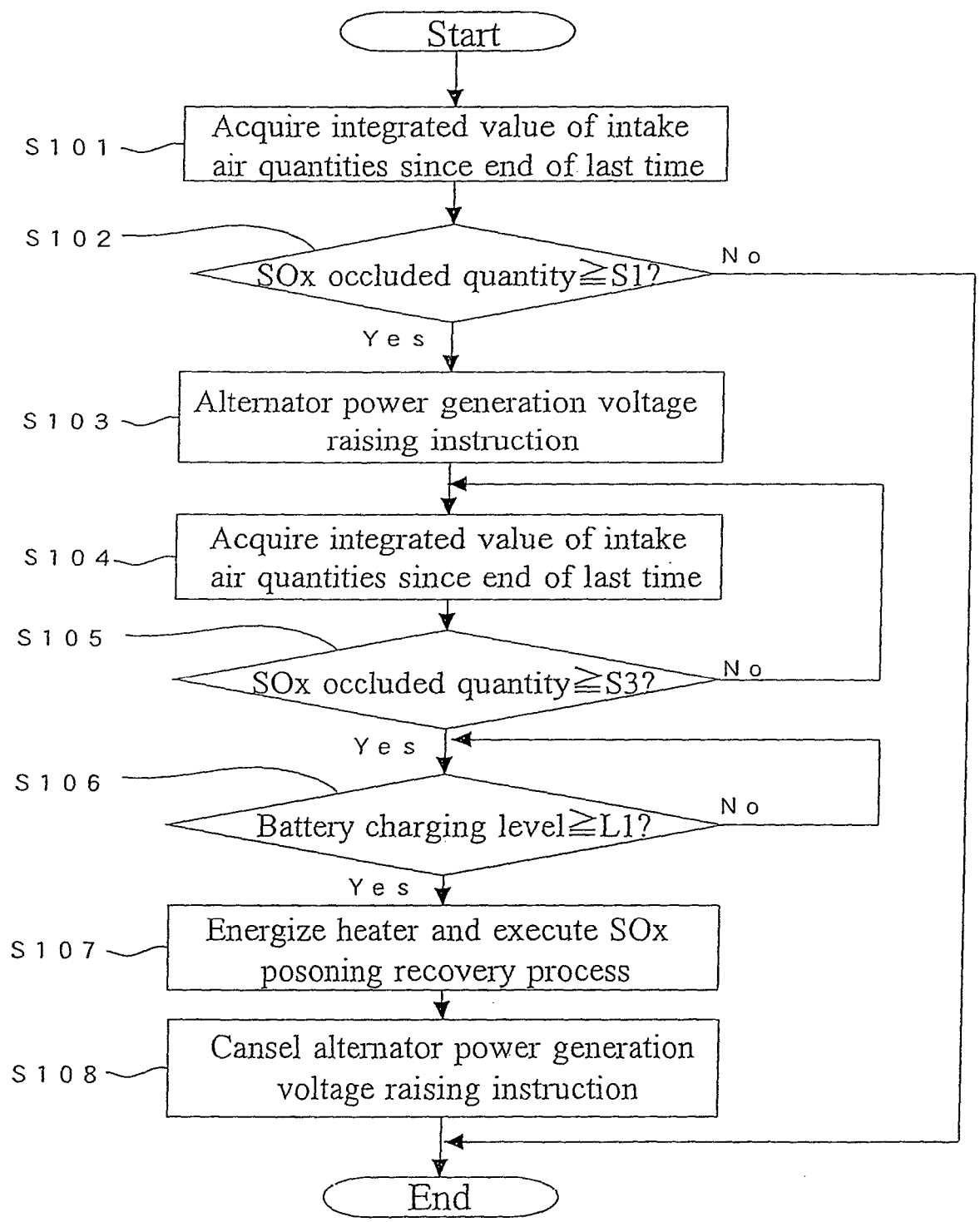
FIG. 2 is a flowchart showing a battery charging routine before recovery of SOx poisoning in an embodiment 1 of the present invention.

FIG. 2 shows a flowchart of a battery charging routine before the SOx poisoning recovery in the embodiment 1.

This battery charging routine is defined as a program stored in a ROM (Read-Only Memory) of the ECU 20 and is executed by the ECU 20 at an interval of a predetermined period during the operation of the internal combustion engine 1.

Upon executing the battery charging routine, to start with, in S101, an integrated value of the intake air quantities given since an end of the SOx poisoning recovery process of the last time is acquired. To be specific, the integrated value of the intake air quantities may also be calculated in the way that the ECU 20 integrates output signals of the airflow meter 11 since the end of the SOx poisoning recovery process of the last time. When finishing S101, the operation proceeds to S102.

In S102, a quantity of the SOx occluded in the DPNR 4b is estimated from the integrated value of the intake air quantities that is acquired in S101. Then, it is determined whether the thus-estimated SOx occluded quantity is equal to or larger than a first SOx occluded quantity S1 or not. Herein, the first SOx occluded quantity S1 is the SOx occluded quantity serving as a threshold value enabling a determination that the SOx poisoning recovery process will be executed in the near future if more of the SOx is occluded in the DPNR 4b, and may also be empirically obtained beforehand. If determined to be negative in S102, the battery charging routine is temporarily terminated. Whereas if determined to be affirmative in S102, the operation proceeds to S103 in order to get ready for the SOx poisoning recovery process.

In S103, the ECU 20 gives an instruction to raise a voltage of the power generation of the alternator 8. Specifically, such control is done as to increase the electric power that can be supplied to the battery 9 even in the case of the same number of revolutions of the internal combustion engine 1 by augmenting a work load of the alternator 8. With this control, the charging level of the battery 9 rises. Upon finishing the process in S103, the operation proceeds to S104.

In S104, the integrated value of the intake air quantities since the end of the SOx poisoning recovery process of the last time is again acquired. A content of the process is the same as in S101. When the process in S104 comes to an end, the operation proceeds to S105.

In S105, the SOx occluded quantity into the DPNR 4b at that point of time is calculated, and it is determined whether this SOx occluded quantity is equal to or larger than a third SOx occluded quantity S3 or not. Herein, the third SOx occluded quantity S3 is the SOx occluded quantity serving as a threshold value from which to determine that a NOx occlusion capacity of the DPNR 4b might decrease if more of the SOx is occluded in the DPNR 4b. Herein, if it is determined that the SOx occluded quantity is smaller than the third SOx occluded quantity S3, getting back to the anteriority to the process in S104, the processes in S104 and S105 are repeatedly executed till it is determined in S105 that the SOx occluded quantity is equal to or larger than the third SOx occluded quantity S3. Then, when determining that the SOx occluded quantity is equal to or larger than the third SOx occluded quantity S3, the operation proceeds to S106.

In S106, it is determined whether the charging level of the battery 9 is equal to or larger than a SOx poisoning recovery level L1 sufficient for executing the SOx poisoning recovery process. Herein, if determining that the charging level of the battery 9 is lower than the SOx poisoning recovery level L1, returning to the anteriority to the process in S106, the process in S106 is repeatedly executed till it is determined that the charging level of the battery 9 is equal to or higher than the SOx poisoning recovery level L1. In the case of determining in S106 that the charging level of the battery 9 is equal to or higher than the SOx poisoning recovery level L1, the operation proceeds to S107.

In S107, the electric heater 4c starts being energized, and the addition of the fuel via the fuel addition valve 13 is started, thereby executing the SOx poisoning recovery process. In S107, duration time of the SOx poisoning recovery process necessary for reduction-releasing the SOx having the third SOx occluded quantity S3 in the DPNR 4b, is predefined, then, it is determined that the SOx in the DPNR 4b has been reduction-released at a point of time when the duration time elapsed, and this process is terminated. When finishing the process in S107, the operation proceeds to S108.

In S108, the instruction to raise the voltage of the power generation of the alternator is canceled. When finishing the process in S108, the battery charging routine is temporarily ended.

As discussed above, in the embodiment 1, in the case of determining that the quantity of the SOx occluded in the DPNR 4b is equal to or larger than the first SOx occluded quantity S1 in the SOx poisoning recovery process, at that point of time, the charging level of the battery 9 is increased by raising the voltage of the power generation of the alternator 8.

Then, at the point of time when the DPNR 4b occludes the SOx having the quantity equal to or larger than the third SOx occluded quantity S3 considered to be the SOx occluded quantity serving as the threshold value for executing the SOx poisoning recovery process, it is confirmed that the charging level of the battery 9 is equal to or higher than the SOx poisoning recovery level L1 needed for executing the SOx poisoning recovery process. Then, after confirming that the charging level of the battery 9 is equal to or higher than the SOx poisoning recovery level L1, the SOx poisoning recovery process is executed by energizing the electric heater 4c.

Accordingly, before the consumption of the large electric power due to the operation of the electric heater 4c, the charging level of the battery 9 can be sufficiently increased, and the load on the battery 9 can be reduced. Furthermore, in the case of operating the electric heater 4c, the charging level of the battery 9 is invariably in a sufficiently high state, and hence the operation of the electric heater 4c can be restrained from being restricted.

Moreover, in the embodiment 1, it is feasible to employ the battery 9 and the alternator 8 each having a small capacity, and it is therefore possible to facilitate cost-down and downsizing of the whole system.

It is to be noted that the embodiment 1 discussed above has exemplified the SOx poisoning recovery process of the DPNR 4b as the performance recovery process, however, the same control can be applied to the PM regeneration process of the DPNR 4b.

Figure 3:
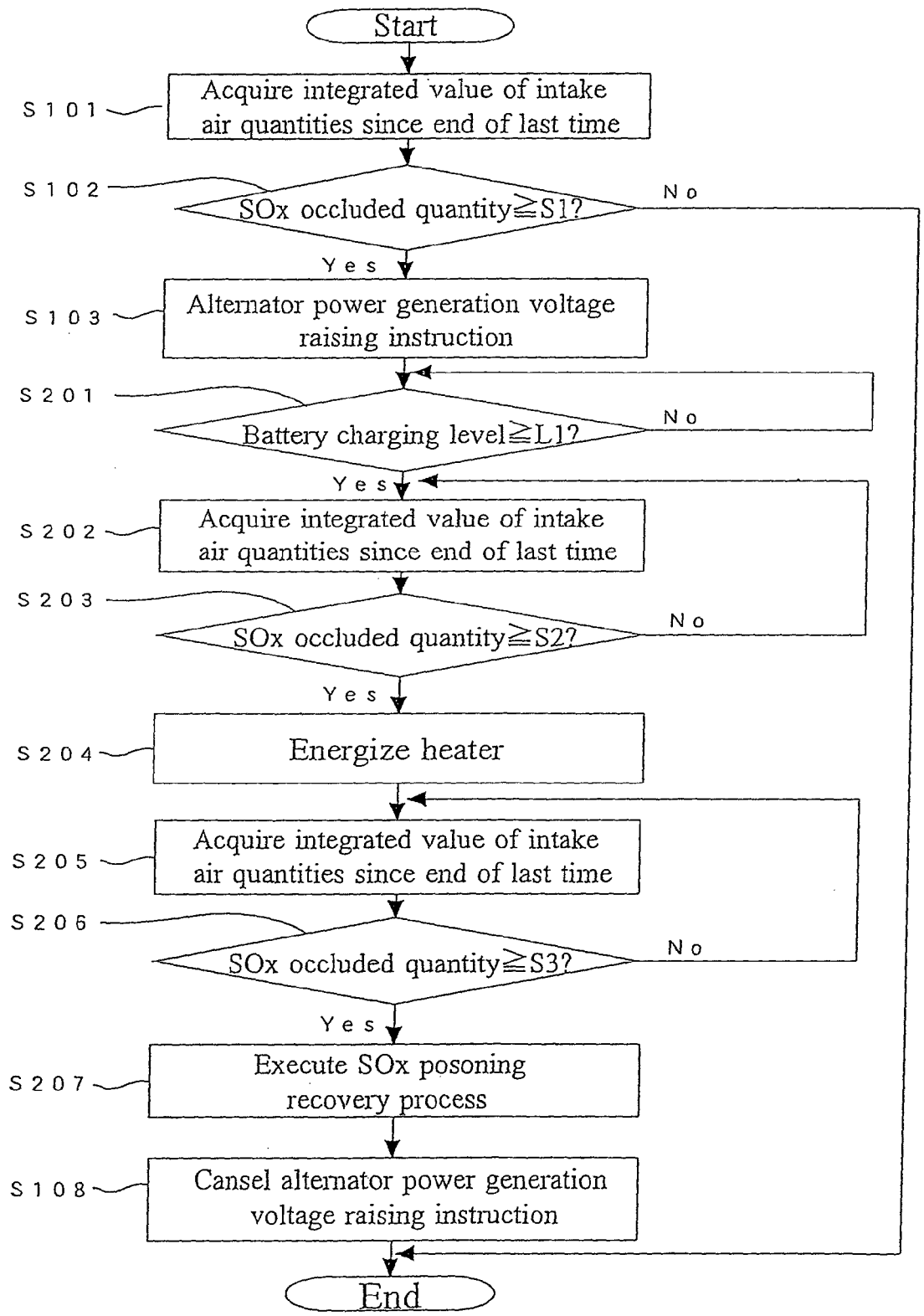
FIG. 3 is a flowchart showing a battery charging routine 2 before the recovery of the SOx poisoning in the embodiment 1 of the present invention.

Next, another mode of the embodiment 1 will be described. FIG. 3 shows a flowchart of a battery charging routine 2 before the recovery of the SOx poisoning as another mode of the embodiment 1. In this mode, processes in S201-S207 are given as substitutes for the processes in S104-S107 in the battery charging routine before the recovery of the SOx poisoning described above. The following discussion will focus on a difference from the battery charging routine before the recovery of the SOx poisoning described above.

In S201 of the battery charging routine 2, to begin with, it is determined whether or not the charging level of the battery 9 is equal to or higher than the SOx poisoning recovery level L1 sufficient for executing the SOx poisoning recovery process. The content of this process is the same as the content of the process in S106 in the battery charging routine before the recovery of the SOx poisoning. A difference therebetween is that the executing order of this process is set earlier. Upon an end of the process in S201, the operation proceeds to S202.

The integrated value of the intake air quantities since the end of the SOx poisoning recovery process of the last time is acquired in S202. The content of the process is the same as in S101. Upon finishing the process in S202, the operation proceeds to S203.

In S203, the SOx occluded quantity in the DPNR 4*b* at that point of time is calculated. Then, it is determined whether this SOx occluded quantity is equal to or larger than a second SOx occluded quantity S2. Herein, the second SOx occluded quantity S2 is larger than the first SOx occluded quantity S1 described above but less than the third SOx occluded quantity S3, and is the SOx occluded quantity considered capable of sufficiently raising the temperatures of the EHC 4*a* and of the DPNR 4*b* on such an occasion that the SOx occluded quantity becomes equal to or larger than the third SOx occluded quantity S3 by starting energizing the electric heater 4*c* at a point of time when more of the SOx is occluded in the DPNR 4*b*. Herein, if it is determined that the SOx occluded quantity is less than the second SOx occluded quantity S2, getting back to the anteriority to the process in S202, the processes in S202 and S203 are repeatedly executed till determining in S203 that the SOx occluded quantity is equal to or larger than the second SOx occluded quantity S2. Then, in the case of determining in S203 that the SOx occluded quantity is equal to or larger than the second SOx occluded quantity S2, the operation proceeds to S204.

In S204, the electric heater 4*c* is switched ON based on the instruction of the ECU 20, and the battery 9 supplies the electric power to the electric heater 4*c*. When finishing the process in S204, the operation proceeds to S205.

The processes in S205 and S206 have the same contents as those of the processes in S104 and S105 in the battery charging routine before the recovery of the SOx poisoning, and hence their explanations are omitted. Upon finishing the process in S206, the operation proceeds to S207.

In S207, the addition of the fuel via the fuel addition valve 13 is started, thereby executing the SOx poisoning recovery process. In S207, duration time of the SOx poisoning recovery process necessary for reduction-releasing the SOx having the third SOx occluded quantity S3 in the DPNR 4*b*, is predefined, then, it is determined that the SOx in the DPNR 4*b* has been reduction-released at a point of time when the duration time elapsed, and this process is terminated.

Thus, in a second mode of the embodiment 1, the charging level of the battery 9 is increased at the point of time when the SOx occluded in the DPNR 4*b* becomes equal to or larger than the first SOx occluded quantity S1, next the electric heater 4*c* starts being energized at the point of time when the SOx occluded in the DPNR 4*b* gets equal to or larger than the second SOx occluded quantity S2, and further the fuel addition is started at the point of time when the SOx occluded in the DPNR 4*b* becomes equal to or larger than the third SOx occluded quantity S3, thereby starting the SOx poisoning recovery process.

According to the second mode, at the point of time when starting the fuel addition via the fuel addition valve 13, the temperature of the EHC 4*a* rises, the added fuel is reformed into the easier-to-react state, and it is feasible to facilitate the gasification of the fuel and the SOx reduction reaction in the DPNR 4*b*.

It should be noted that the second mode has exemplified the SOx poisoning recovery process of the DPNR 4*b*, however, the second mode of the embodiment 1 may also be applied to the NOx reduction process of the DPNR 4*b*. This scheme also enables the NOx reduction process of the DPNR 4*b* to be executed highly efficiently.

It is to be noted that the ECU 20 executing the process in S102 as described above corresponds to electric power consumption predicting unit. Further, in the embodiment 1, the electric power quantity (consumed in S107) needed for reduction-releasing the SOx having the third SOx occluded quantity S3 from the DPNR 4*b*, corresponds to an electric power quantity equal to or larger than a predetermined quantity. The electric power quantity equal to the predetermined quantity may be predefined empirically as the electric power quantity equal to or smaller than the electric power quantity consumed in S107. Moreover, the SOx poisoning recovery level L1 as the charging level of the battery 9 corresponds to a pre-power-consumption level. Further, the ECU 20 executing the battery charging routine before the recovery of the SOx poisoning or the battery charging routine 2 before the recovery of the SOx poisoning, corresponds to pre-power-consumption charging unit. Still further, the ECU 20 executing the SOx poisoning recovery process itself corresponds to performance recovering unit. Yet further, the first SOx occluded quantity S1 corresponds to a first accumulated quantity. The second SOx occluded quantity S2 correspond to a second accumulated quantity. The third SOx occluded quantity S3 corresponds to a third accumulated quantity.

Moreover, the electric heater 4*c* described above corresponds to an electrical loading device. It is to be noted that the embodiment 1 discussed above has exemplified providing the electric heater 4*c* as the electrical loading device. Other examples of the electrical loading device can include an electrically-driven actuator employed for the respective types of control, like a motor and a solenoid device and a valve etc, and a motor-driven pump in the internal combustion engine.

Embodiment 2

An embodiment 2 of the present invention will be described. The constructions of the internal combustion engine, the intake/exhaust system and the control system in the embodiment 2 are the same as those described in the embodiment 1. Further, the embodiment 2 will discuss an example of how the charging level of the battery 9 is maintained by increasing the number of idling revolutions of the internal combustion engine 1 irrespective of the ON/OFF states of the electric heater 4*c* during the execution of the SOx poisoning recovery process of the DPNR 4*b*.

Figure 4:
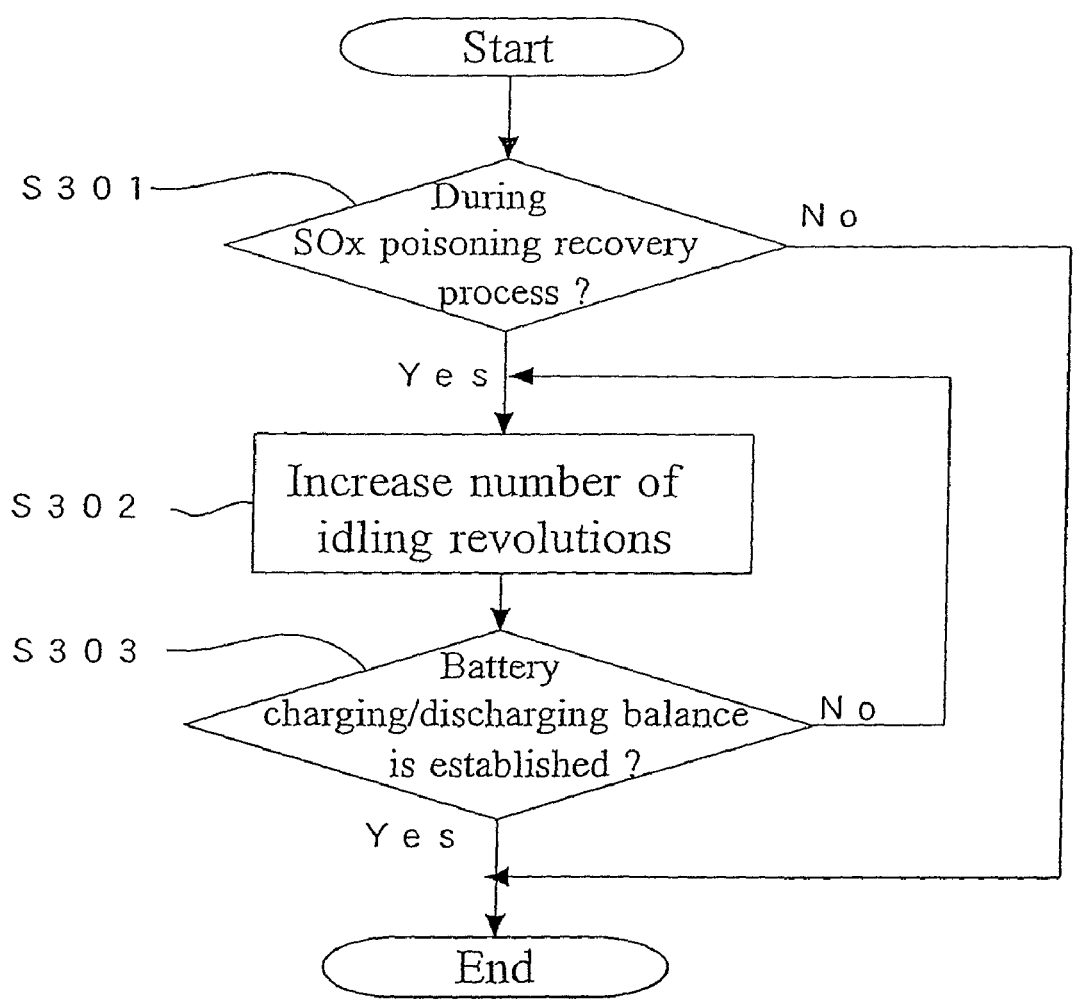
FIG. 4 is a flowchart showing the battery charging routine during the recovery of the SOx poisoning in an embodiment 2 of the present invention.

FIG. 4 shows a flowchart of the battery charging routine during the recovery of the SOx poisoning in the embodiment 2.

When executing the battery charging routine, at first, it is determined in S301 whether kept in the SOx poisoning recovery process or not. To be specific, this may be determined by detecting drive signals given to the electric heater 4*c* and to the fuel addition valve 13. If determined not to be kept in SOx poisoning recovery process, the battery charging routine is temporarily finished. Whereas if determined to be kept in SOx poisoning recovery process, the operation proceeds to S302

In S302, the number of idling revolutions of the internal combustion engine 1 is increased. With this increase, the power supply to the battery 9 by the alternator 8 is augmented, and the charging level of the battery 9 is raised. When finishing the process in S302, the operation proceeds to S303.

In S303, in a relation with an ON/OFF interval of the electric heater 4*c* during the SOx poisoning recovery process, it is determined whether a charging/discharging balance of the battery 9 is established or not. This intends to determine whether or not the electric power supplied to the battery 9 from the alternator 8 at that point of time is equal to or larger than electric power consumption in the electric heater 4*c*. Herein, if a discharged amount (the electric power consumption) is determined to be larger than a charged amount (electric power supply) (if the charging/discharging balance is not established) in the battery 9, getting back to the anteriority to the process in S302, the number of idling revolutions is further increased, and the charged amount of the battery 9 by the alternator 8 is augmented. On the other hand, if the charged amount is determined to be equal to or larger than the discharged amount (if the charging/discharging balance is established), the battery charging routine is temporarily finished.

As discussed above, a scheme of the embodiment 2 is that the number of idling revolutions of the internal combustion engine 1 is increased up to the number of idling revolutions that establishes the charging/discharging balance irrespective of the ON/OFF states of the electric heater 4c during the SOx poisoning recovery process of the DPNR 4b. It is therefore possible to restrain the number of idling revolutions of the internal combustion engine 1 from changing in linkage with the ON/OFF states of the electric heater 4c as by the conventional control of increasing the number of idling revolutions during the ON state of the electric heater 4c, and to restrain an uncomfortable feeling from being given to a vehicle occupant.

It should be noted that the control in the embodiment 2 can be also applied to the PM regeneration process of the DPNR 4b. Further, the increased number of idling revolutions in the process in S302 described above corresponds to the number of idling revolutions during performance recovery.

Embodiment 3

Next, an embodiment 3 of the present invention will be described. The embodiment 3 will exemplify an example, wherein if the internal combustion engine stops during the SOx poisoning recovery process of the internal combustion engine, the electric heater is inhibited from being energized during a predetermined period when the internal combustion engine is started next time. The constructions of the internal combustion engine, the intake/exhaust system and the control system in the embodiment 3 are the same as those explained in the embodiment 1.

Figure 5:
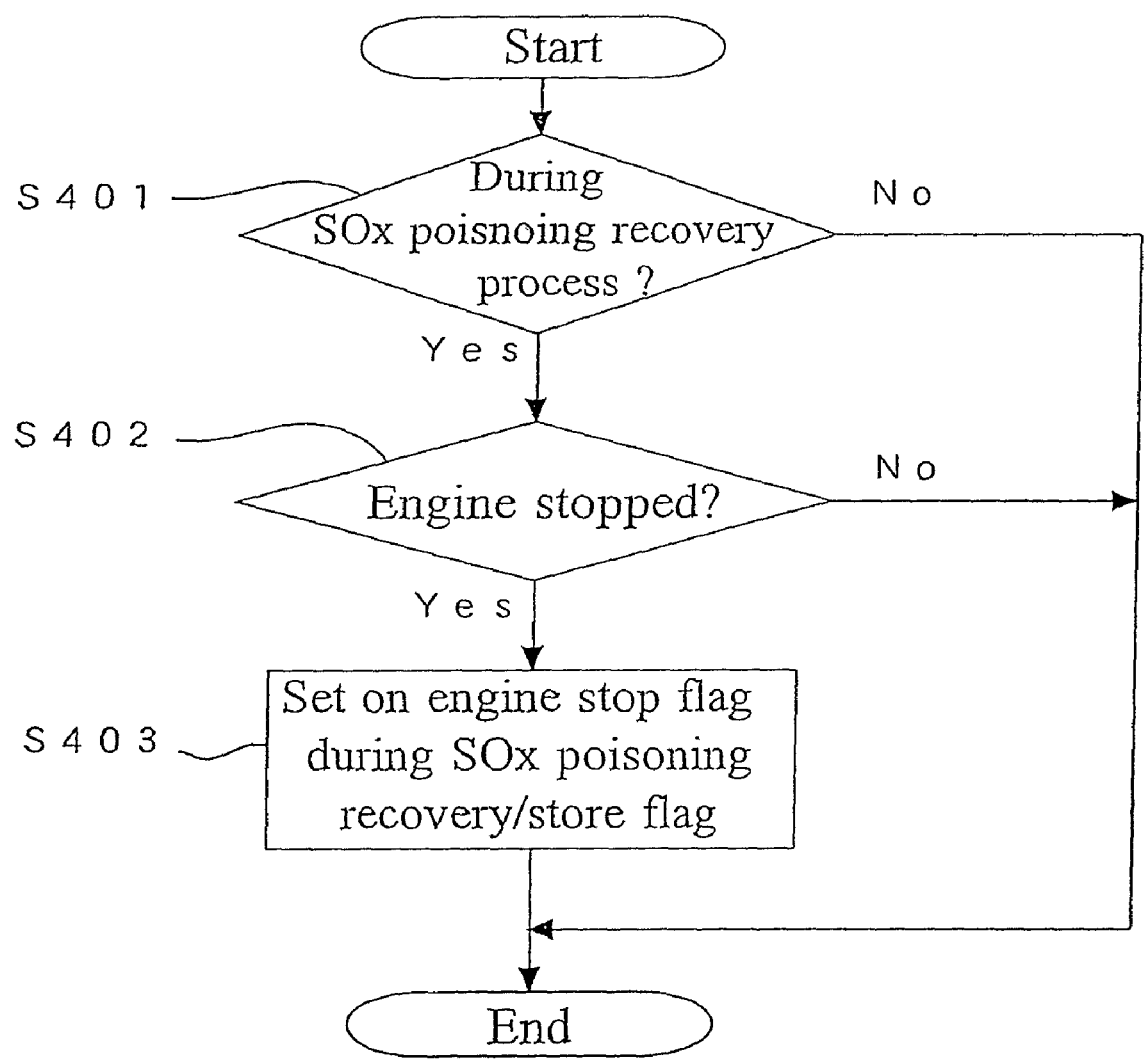
FIG. 5 is a flowchart showing an engine stop routine during the recovery of the SOx poisoning in an embodiment 3 of the present invention.
Figure 6:
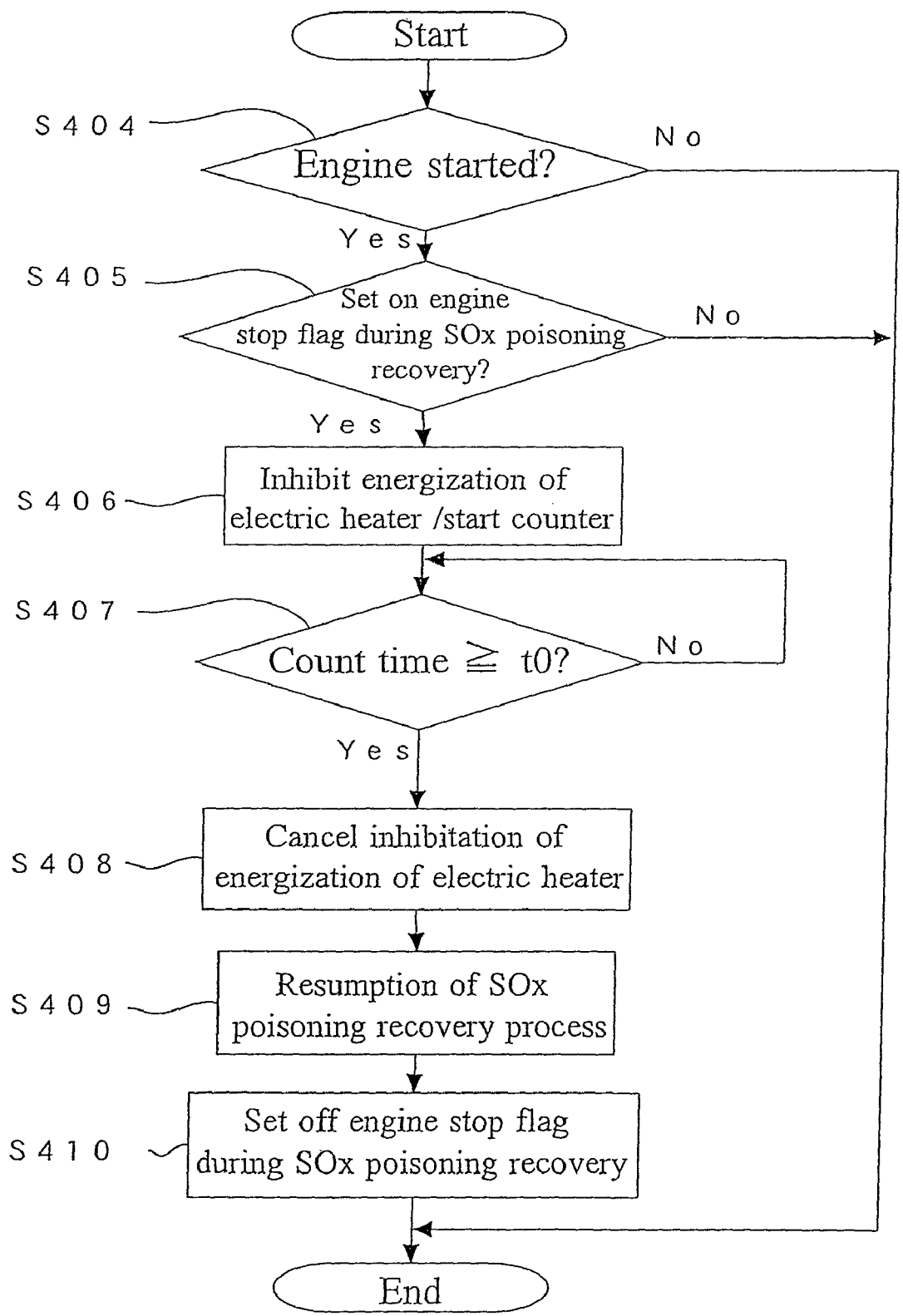
FIG. 6 is a flowchart showing a heater energizing inhibition routine when starting up the engine in the embodiment 3 of the present invention.

FIGS. 5 and 6 show a flowchart of an engine stop routine during the recovery of the SOx poisoning and a flowchart of a heater energizing inhibition routine at an engine startup time in the embodiment 3. To start with, the engine stop routine during the recovery of the SOx poisoning will be described.

Upon executing the engine stop routine, at first it is determined in S401 whether the operation is in the SOx poisoning recovery process or not. Herein, if determining that the operation is not in the SOx poisoning recovery process, the engine stop routine is temporarily finished. Whereas if determining that the operation is in the SOx poisoning recovery process, the operation proceeds to S402. It is determined in S402 whether the engine is stopped or not. To be specific, the determination may be made based on an operation signal of the unillustrated fuel injection valve or ignition plug. Herein, if determining that the engine is not stopped, the engine stop routine is temporarily finished. Whereas if determining that the engine is stopped, the operation proceeds to S403.

In S403, an engine stop flag during the recovery of the SOx poisoning is set ON, and this ON-status is stored. When terminating the process in S403, the engine stop routine is temporarily finished.

A subsequent description is about a flowchart of the heater energizing inhibition routine at the engine startup time. When executing the heater energizing inhibition routine, at first, it is determined in S404 whether the engine is started up or not. Herein also, specifically, the determination may be made based on the operation signal of the unillustrated fuel injection valve or ignition plug. Herein, if determining that the engine is not started up, the heater energizing inhibition routine is temporarily finished. Whereas if determining that the engine is started up, the operation proceeds to S405.

It is determined in S405 whether or not the engine stop flag during the recovery of the SOx poisoning is set ON. Herein, if determined to be negative, the heater energizing inhibition routine is temporarily finished. Whereas if determined to be affirmative, the operation proceeds to S406.

In S406, the electric heater 4c is inhibited from being energized, and a time counter starts measuring the time. Upon finishing the process in S406, the operation proceeds to S407.

It is determined in S407 whether the measured time is equal to or longer than heater energizing inhibition time t0. This heater energizing inhibition time t0 is time for which to determine that even if the reducing agent gets residual in the EHC 4a when starting up the engine, the reaction of the residual reducing agent will have been finished with an elapse of the heater energizing inhibition time t0 since the startup of the internal combustion engine 1, and the residual reducing agent does not react at once even by energizing the electric heater 4c. Herein, if it is determined that the measured time is shorter than the heater energizing inhibition time t0, the fuel residual within the EHC 4a when started up does not yet react completely, and hence, getting back to the anteriority to the process in S407, the process in S407 is repeatedly executed till it is determined that the measured time is equal to or longer than the heater energizing inhibition time t0. Whereas if it is determined that the measured time is equal to or longer than the heater energizing inhibition time t0, it can be determined that the reaction of the fuel residual in the EHC 4a has been finished, and therefore the operation proceeds to S408.

In S408, the inhibition of energizing the electric heater 4c is canceled, the electric heater 4c starts heating the EHC 4a. When finishing the process in S408, the operation proceeds to S409.

In S409, the fuel addition via the fuel addition valve 13 resumes, and the SOx poisoning recovery process also resumes. When finishing the process in S409, the operation proceeds to S410.

In S410, the engine stop flag during the recovery of the SOx poisoning is set OFF. Upon finishing the process in S410, the heater energizing inhibition routine is terminated.

As discussed above, the scheme of the embodiment 3 is that if the internal combustion engine 1 stops during the SOx poisoning recovery process, the electric heater 4c is inhibited from, on the occasion of starting up the internal combustion engine 1 next time, being energized till the reaction of the fuel residual in the EHC 4a finishes.

It is therefore feasible to restrain the temperature of the EHC 4a from excessively rising due to such a phenomenon that the fuel residual in the EHC 4a reacts at once upon energizing the electric heater 4c.

Embodiment 4

Next, an embodiment 4 will be described. The embodiment 4 will exemplify an example of determining whether a fault occurs in the electric heater as far as the charging level of the battery sufficiently rises without any prediction. The constructions of the internal combustion engine, the intake/exhaust system and the control system in the embodiment 4 are the same as those described in the embodiment 1.

Figure 7:
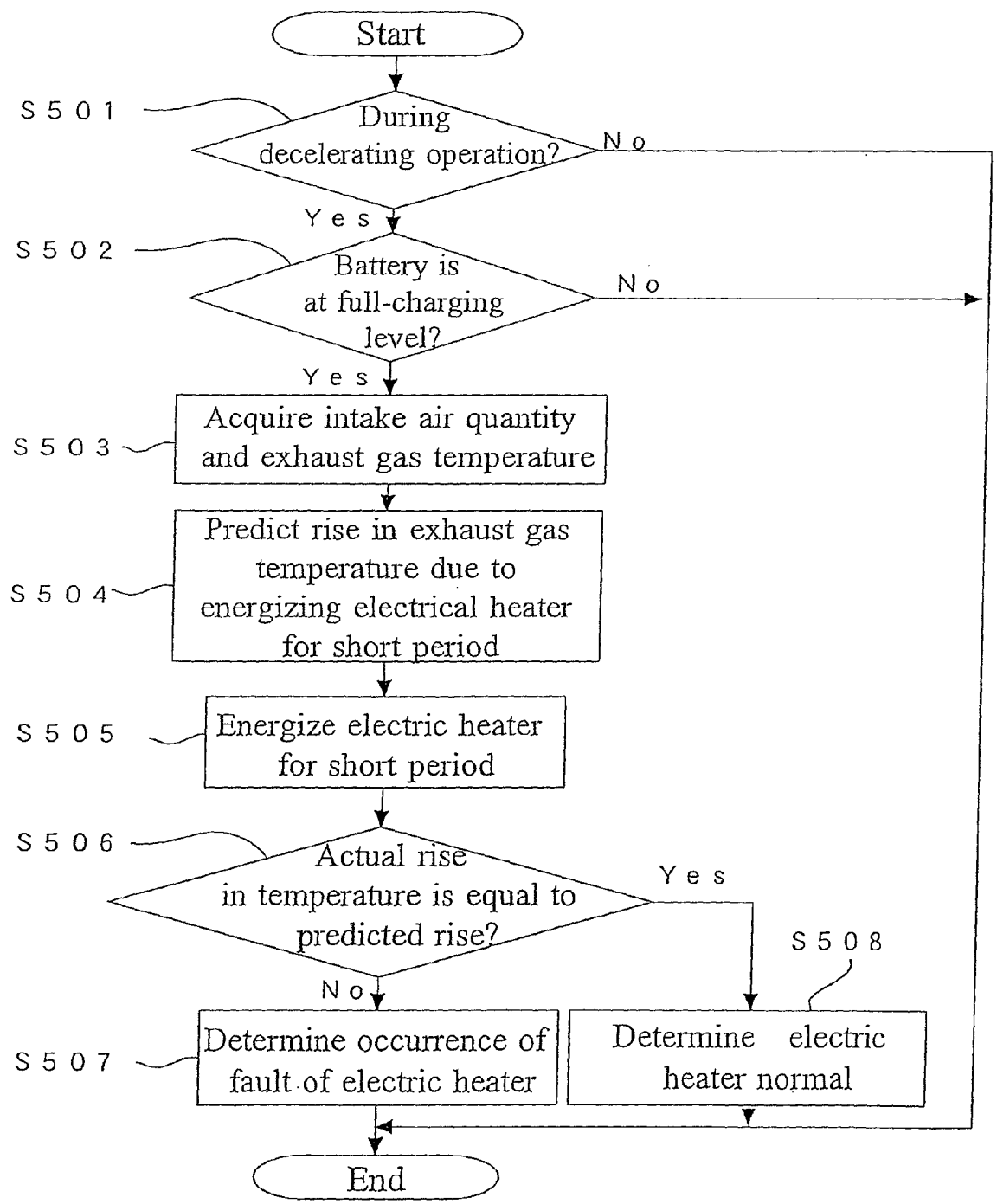
FIG. 7 is a flowchart showing an electric heater fault determining routine in an embodiment 4 of the present invention.

FIG. 7 shows a flowchart of an electric heater fault determination routine in the embodiment 4. When executing the electric heater fault determination routine, to begin with, it is determined in S501 whether in a decelerating operation or not. To be specific, whether in a fuel-cut state or not may be determined from detecting the drive signal to the unillustrated fuel addition valve in the internal combustion engine 1. Herein, if determining that it is not in the decelerating operation, the electric heater fault determination routine is temporarily finished. Whereas if determining that it is in the decelerating operation, the operation proceeds to S502.

It is determined in S502 whether the charging level of the battery 9 is a full-charging level or not. To be specific, this determination is made based on whether the voltage of the battery 9 is equal to or larger than a full-charging voltage. Herein, if determining that the charging level of the battery 9 is not the full-charging level, the electric heater fault determination routine is temporarily finished. Whereas if determining that the charging level of the battery 9 is the full-charging level, the operation proceeds to S503.

In S503, an intake air quantity and a temperature of the exhaust gas are detected. The intake air quantity is acquired from an output signal of the airflow meter 11, the temperature of the exhaust gas is acquired from an output signal of an exhaust gas temperature sensor 14. When finishing the process in S503, the operation proceeds to S504.

In S504, a rise in the temperature of the exhaust gas is predicted in the case of energizing the electric heater 4c during only a short period $\Delta t$. Specifically, a relation between the intake air quantity, the temperature of the exhaust gas and the rise in the temperature of the exhaust gas when energizing the electric heater 4c during the short period $\Delta t$, is empirically obtained beforehand and organized into a map, and the rise in the temperature of the exhaust gas, which is mapped to the intake air quantity and the temperature of the exhaust gas acquired in S503, is read from the map, thus predicting the rise in the temperature thereof. Upon finishing the process in S504, the operation proceeds to S505.

In S505, the electric heater 4c is actually energized over the short period $\Delta t$. When finishing the process in S505, the operation proceeds to S506.

In S506, it is determined whether or not the actual rise in the temperature is equal to the predicted rise in the temperature. Specifically, at this point of time, the exhaust gas temperature sensor 14 detects the actual rise in the temperature, and it is determined whether or not an absolute value of a difference from the predicted value is equal to or smaller than a predetermined temperature difference $\Delta T$. The operation diverts to S508 if the actual rise in the temperature is equal to the predicted value but proceeds to S507 whereas if not equal.

In S507, the as-predicted rise in the temperature of the exhaust gas is not acquired due to energizing the electric heater 4c, and hence it is determined that the electric heater 4c gets into a fault. At this point of time, an alarm light provided at a driving seal may be lit on. While on the other hand, in S508, the as-predicted rise in the temperature of the exhaust gas is acquired due to energizing the electric heater 4c, and therefore it is determined that the electric heater 4c is in a normal state. When finishing the process in S507 or S508, the electric heater fault determination routine is temporarily finished.

As discussed above, the scheme of the embodiment 4 is that the electric heater 4c is diagnosed about its fault by energizing the electric heater 4c only when the vehicle is in the process of decelerating and when the charging level of the battery 9 is the full-charging level without any prediction. It is therefore possible to restrain the excessive load from being exerted on the battery 9 on the occasion of making the diagnosis about the fault. Further, the diagnosis about the fault is conducted at the timing when the charging level of the battery 9 is the full-charging level with no prediction without performing the control of intentionally increasing the charging level of the battery 9, and hence deterioration in fuel consumption can be restrained to the greatest possible degree.

It should be noted that the ECU 20 executing the process described above in S502 corresponds to charging level detecting unit. Further, in the embodiment 4, the full-charging level of the battery 9 corresponds to a fault diagnosing level. The fault diagnosing level is not necessarily the full-charging level and may also be a level lower than the full-charging level. Moreover, the ECU 20 executing the processes S503-S506 corresponds to heater fault diagnosing unit.

Embodiment 5

Next, an embodiment 5 of the present invention will be described. The embodiment 5 will exemplify an example of energizing, after starting up the internal combustion engine, the electric heater after a quantity of the exhaust gas passing through the exhaust gas purifying device has become equal to or larger than a predetermined value. Note that the constructions of the internal combustion engine, the intake/exhaust system and the control system in the embodiment 5 are the same as those described in the embodiments discussed above.

In the embodiment 5, the integrated value of the intake air quantities is acquired after starting up the internal combustion engine 1. To be specific, the integrated value is calculated by integrating the output signals of the airflow meter 11 in the ECU 20. Then, waiting till the integrated value becomes equal to or larger than a heater energizing permission air quantity GA1 as a threshold value, the electric heater 4c starts being energized. Note that the integrated value of the intake air quantities is approximately the same as an integrated value of quantities of the exhaust gases passing through the exhaust gas purifying device 4.

The heater energizing permission air quantity GA1 is the integrated value of the intake air quantities considered not to exert bad influence on the internal combustion engine 1, if the integrated value of the intake air quantities is equal to or larger than the heater energizing permission air quantity GA1, the warm-up of the internal combustion engine 1 having made progress, even when increasing the number of idling revolutions in order to maintain or raise the charging level of the battery 9, and is empirically obtained beforehand.

According to this scheme, when starting energizing the electric heater 4c, the warm-up of the internal combustion engine 1 has made progress to some extent, and hence the number of idling revolutions can be sufficiently increased in order to maintain and raise the charging level of the battery 9.

It is to be noted that the value of the heater energizing permission air quantity GA1 may be changed based on a cooling water temperature detected by the cooling water temperature sensor 12 when starting up the internal combustion engine 1. Specifically, the value of the heater energizing permission air quantity GA1 may be made smaller as the cooling water temperature gets higher when starting up the internal combustion engine 1. FIG. 8 shows an example of a relation between the cooling water temperature when starting up the internal combustion engine 1 and the heater energizing permission air quantity GA1.

According to this scheme, if the warm-up has already made progress when starting up the internal combustion engine 1, the energization of the electric heater 4c can be restrained from being delayed for a long period of time with futility, and the exhaust gas purifying device 4 can be activated faster.

It should be noted that the heater energizing permission air quantity GA1 corresponds to a trigger exhaust gas quantity.

INDUSTRIAL APPLICABILITY

According to the present invention, the electrical loading device such as the electric heater for the catalyst attached with the electric heater can be more surely operated without exerting the excessive load on the battery.

The invention claimed is:

1. A power source system of an internal combustion engine, comprising:
    an exhaust gas purifying device purifying an exhaust gas of said internal combustion engine;
    a performance recovering unit executing a performance recovery process of recovering exhaust gas purifying performance of said exhaust gas purifying device by removing matters accumulated in said exhaust gas purifying device as said exhaust gas purifying device purifies the exhaust gas in a way that heats said exhaust gas purifying device; and
    an electric heater generating the heat by energization, and heating said exhaust gas purifying device, wherein if said internal combustion engine stops during execution of the performance recovery process by said performance recovering unit, the performance recovery process stops before the internal combustion engine starts up a next time, and said electric heater is inhibited from being energized during a predetermined period after starting up said internal combustion engine next time,
    wherein the predetermined period during which the electric heater is inhibited from being energized is a time required for substantial completion of a reaction of a residual reducing agent in the exhaust gas purifying device.

* * * * *